Figure 1:
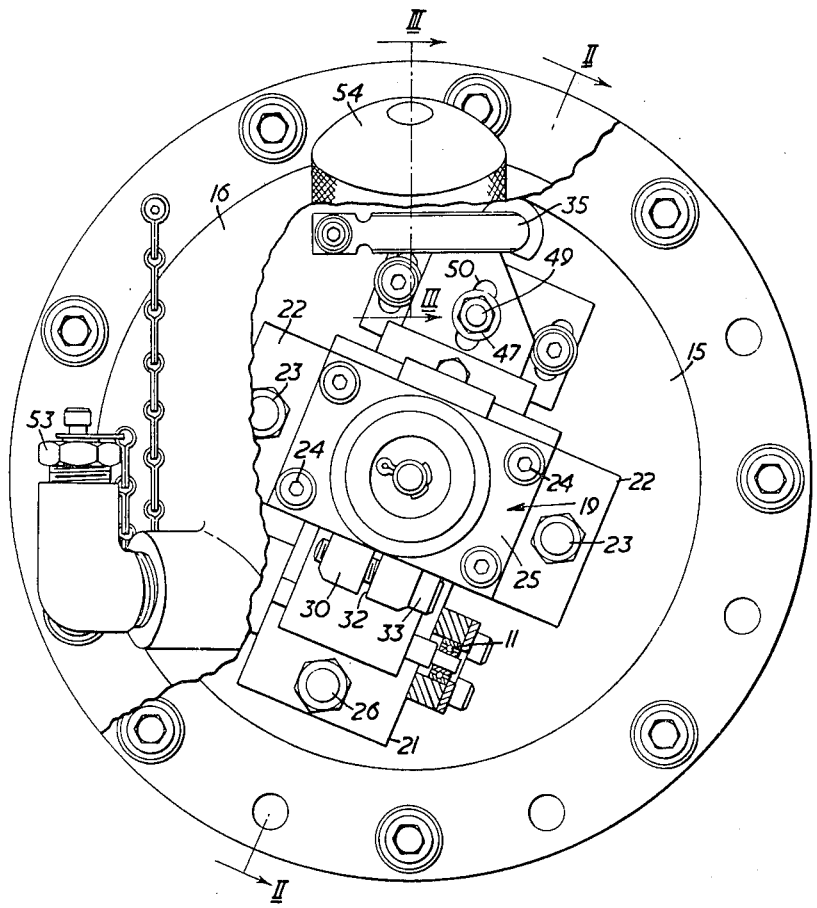

Aug. 10, 1965   H. A. HALLETT   3,199,351
PNEUMATIC TRANSMITTERS
Filed Oct. 2, 1961   2 Sheets-Sheet 1

INVENTOR
HENRY ALBERT HALLETT
BY Irwin S. Thompson
ATTORNEY

United States Patent Office 3,199,351
Patented Aug. 10, 1965

3,199,351
PNEUMATIC TRANSMITTERS
Henry Albert Hallett, Cheltenham, England, assignor to Cheltenham Auto Controls Limited, Cheltenham, England
Filed Oct. 2, 1961, Ser. No. 142,412
Claims priority, application Great Britain, Oct. 6, 1960, 34,256/60
7 Claims. (Cl. 73—316)

This invention relates to pneumatic transmitters of the force-balance type comprising a balancing element to which in use an input force and an opposed pneumatic balancing force derived in dependence upon the position of the element are applied. The input force is normally representative of a variable to be measured and/or controlled, and the pneumatic pressure providing the balancing force directly or indirectly provides an output signal which can be fed, for example, to a remote indicator.

The invention provides a transmitter which is readily adaptable for use with a gauge measuring or controlling the depth of liquid in a tank, the depth being sensed by a float floating in the liquid. With previous forms of tank depth gauge it has been a problem to provide an output signal, for remote indication or control of the depth, which accurately represents the float position and the object of the invention is to provide a pneumatic transmitter which can be used in such a gauge to provide an output signal which accurately and reliably represents the float position.

According to the invention a pneumatic transmitter of the foregoing type has an input member mounted for rotary movement and arranged to load the balancing element to provide an input force acting on the latter dependent upon the angular position of the input member, so that in use the balancing pressure and hence the output signal also is dependent upon such angular position.

When the transmitter is incorporated in a tank depth gauge the float of the latter may be suspended on a tape which is wound on to and off a drum as the liquid level rises and falls, the drum being coupled to the input member so that the angular position of the latter is dependent upon the length of tape wound on the drum and hence upon the liquid level.

Preferably the input member forms the screw of a screw and nut assembly the nut of which applies the input force to the balancing element through resilient means, such as a compression spring. The balancing element may be a lever controlling a flapper which acts to throttle a nozzle in dependence upon the position of the lever, this nozzle exhausting to atmosphere and the upstream nozzle pressure providing both the balancing pneumatic pressure and the output signal. This pressure is conveniently applied to a balancing bellows with one end wall fixed and the other end wall attached to the lever.

Figure 3:
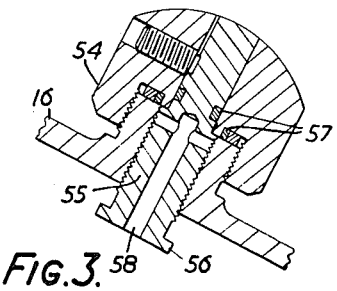
Figure 2:
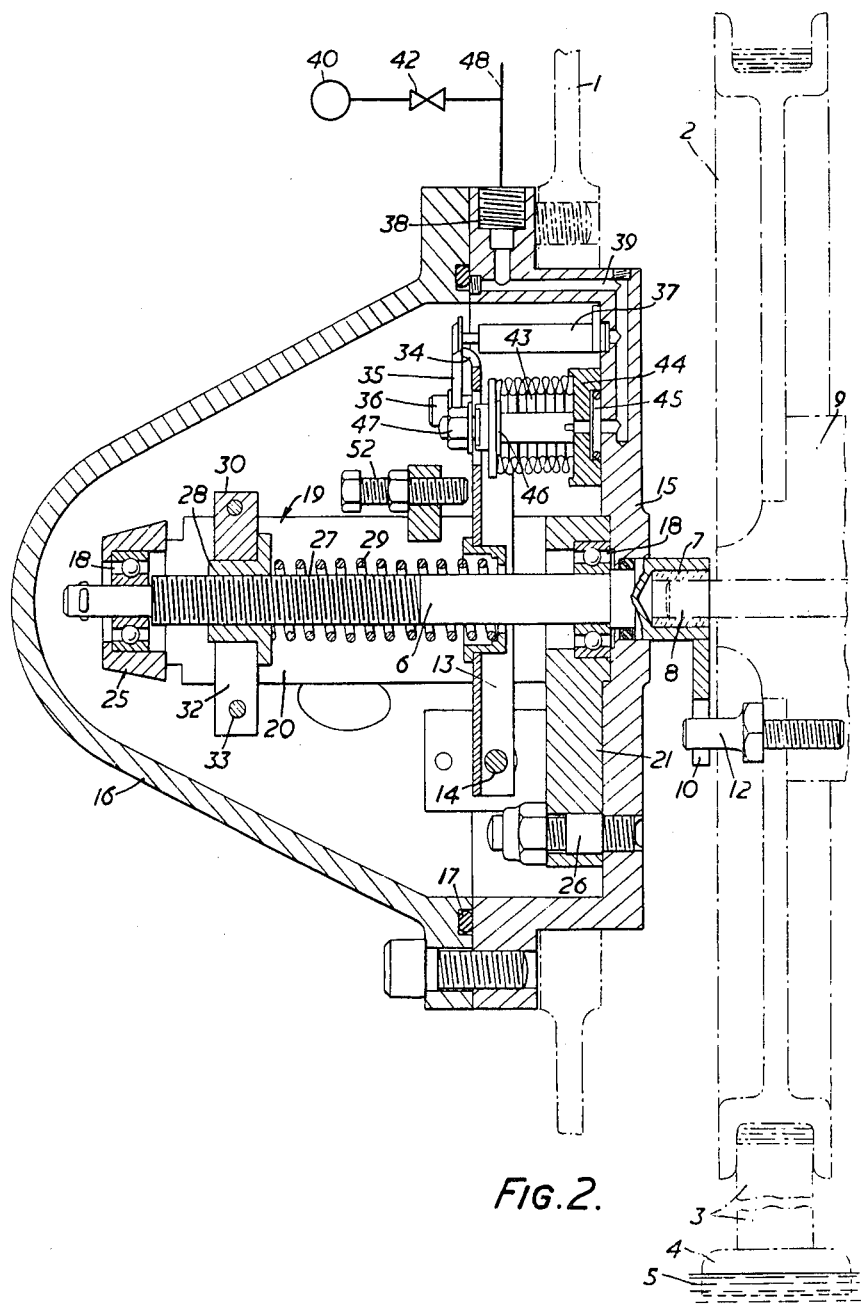

The invention will now be further described with reference to the accompanying drawings which illustrate, by way of example, a pneumatic force-balance transmitter in accordance with the invention incorporated in a tank depth gauge, and in which:

FIGURE 1 is a side view of the transmitter with a removable cover partially cut away to show internal detail, FIGURE 2 is a sectional view on the line II—II in FIGURE 1, and FIGURE 3 is a detail sectional view on the line III—III in FIGURE 1.

The gauge is mounted in a main casing 1 on top of the tank (not shown) and comprises a spring-loaded gauge drum 2 mounted for rotation about a horizontal axis and around which is wound the upper end of a tape 3 which extends to a float 4 which rests on the surface of the liquid 5. Thus the length of the tape 3 wound on the drum 2 and hence the angular position of the latter depends upon the liquid level. The gauge, apart from the transmitter, is not novel and can be of any suitable form. Hence all except the transmitter is not illustrated in detail, and is shown in broken lines in FIGURE 2 merely sufficiently to show its relationship to the transmitter.

The transmitter is mounted to one side of the drum 2 and is spigoted in an aperture in the main casing 1. The transmitter has a rotary input member 6 which is aligned with the axis of the drum 2 and is bushed at 7 at the inner end adjacent the drum 2 to form a bearing for a projecting spindle 8 of the drum. At its inner side the drum 2 has a central hub 9 subject to the spring loading and mounted in bearings. The main purpose of the bush 7 is to ensure a coaxial relationship for the drum 2 and the member 6. A slotted arm 10 projects radially from the inner end of the input member 6 and engages an eccentric pin 12 on the drum to provide a drive connection between the drum 2 and the member 6.

The input member 6 extends through an aperture in a lever 13 of pressed form forming a balancing element and pivoted at 14 adjacent its lower end about bearings 11. The bushed end of the member 6 projects from a dished mounting plate 15 of the transmitter which is bolted to the casing 1. A removable cover 16 is bolted to the plate 15 and sealed thereto by an intervening O ring 17. All the internal parts of the transmitter are mounted on the plate 15, and the member 6 is rotatably mounted in two ball bearings 18 respectively housed in a bearing plate 21 and an outrigger bearing frame 19.

The frame 19 is of generally U shape with parallel side limbs 20 outwardly flanged at 22 for fixing to the plate 15 by studs 23. To the intermediate limb of the frame 19 there is fixed by means of bolts 24 a housing 25 for the corresponding bearing 18. The plate 21 is spigoted into the plate 15 for accurate location thereon and is attached thereto by means of a stud 26.

The input member 6 forms the screw of a screw and nut assembly, being threaded over a portion 27 adjacent its outer end for this purpose, and a tubular nut 28 is arranged outwardly of the lever 13. A compression spring 29 between the nut 28 and the lever 13 loads the latter with an input force dependent upon the angular position of the input member 6 and hence upon the liquid level.

The nut 28 is clamped within a block 30 which is split at 32 and provided with a clamping screw 33. The block 30 is guided between the side limbs 20 to prevent the nut 28 turning with the member 6, and the screw 33 can be slackened off to allow the nut 28 to be turned for calibration purposes, after which the screw 33 is retightened.

At its upper end the lever 13 has an upturned lip 34 which engages beneath a flapper 35 mounted on a pillar 36 on the plate 15 and arranged in throttling relationship to a fixed nozzle 37 which can be supplied with air through an inlet connection 38 and an internal passage 39. In use the connection 38 is fed from a controlled pressure source 40 through a fixed restrictor 42, the nozzle 37 exhausting directly to atmosphere within the cover 16.

A bellows 43 connected to the passage 39 is mounted on the plate 15 inwardly of the lever 13 adjacent the upper end of the latter. The inner end wall 44 of the bellows is fixed and holds a restrictor 45 in position, and the outer end wall 46 is attached directly to the lever 13 by a nut 47. Thus inward movement of the lever 13, i.e. towards the drum 2, as a result of movement of the nut 28 when the liquid level rises increases the throttling of the nozzle 37 by allowing the flapper 35 to move towards the nozzle under its natural resiliency and hence increases the balancing pressure fed to the bellows 43. The lever 13 settles at a new position, the restrictor 45 having a damping action producing stability of operation with the nozzle 37 throttled to provide a balancing force balancing the new input force; the balancing pressure varies proportionally with the liquid level.

An external output tapping 48 between the restrictor 42 and the connection 38 provides an output signal equal to the proportional balancing pressure, and this output signal may be fed to a remote indicator (not shown) or any other desired means, such as a liquid level controller.

As already mentioned the nut 28 is held against rotation with the screw or member 6 by the block 30, the screw 33 of which can be slackened off to allow the nut 28 to be moved manually along the screw 6 for zero calibration of the transmitter. The point of attachment of the bellows 43 to the lever 13 is adjustable lengthwise of the latter for range calibration of the transmitter. This adjustment is achieved by moving a stud 49 of the nut 47 along a slot 50 in the lever 13.

An adjustable stop screw 52 limits angular movement of the lever 13 to prevent accidental damage to the bellows 43 or nozzle 37 and flapper 35 which might otherwise result from excessive movement of the lever 13.

The cover 16 is provided with an oir filter plug 53 which can be removed to fill up the lower portion of the transmitter with oil. At an upper level a vent plug 54 is provided which vents from the cover 16 air exhausted by the nozzle 37. The plug 54 is shown in detail in FIGURE 3 and has a threaded stem 55 held captive in the cover 16 by an end flange 56. Seals 57 seal the plug 54 when screwed fully into the cover 16, and when the plug 54 is screwed fully out a passage 58 within the stem 55 vents the transmitter. The described arrangement is intended for use on board ship, and when the ship is at sea and the gauge not in use the vent plug 54 is screwed in to seal the transmitter and prevent oil leakage when the ship rolls. When the plug 54 is screwed out the apparatus is ready for use.

I claim:

1. A pneumatic transmitter comprising a rotary primary input member, a balancing element, spring means connected between said member and said element, means responsive to rotation of said member to act on said spring means to load said element resiliently to a degree dependent upon the rotary position of said member, a nozzle, means for supplying fluid under pressure to the nozzle, means responsive to the position of said element for throttling said nozzle thereby to alter the pressure of said fluid, and means responsive to said fluid pressure to act on said element against the action of said spring means.

2. A pneumatic transmitter according to claim 1, further comprising a screw-and-nut assembly, the screw of which is formed by said input member, the nut of said assembly comprising said first-named responsive means and acting to compress said spring means to load said balancing element.

3. A pneumatic transmitter according to claim 2, wherein said balancing element is in the form of a lever, and a flapper which acts to throttle said nozzle and is moved by said lever.

4. A pneumatic transmitter according to claim 3, wherein said means responsive to said fluid pressure comprise a balancing bellows having one end wall fixed and the opposite end wall attached to said lever, the internal volume of the bellows being in communication with said fluid under pressure.

5. A pneumatic transmitter according to claim 4, wherein the point of attachment of said other end wall of the bellows to the lever is adjustable.

6. A pneumatic transmitter comprising a rotary primary input member in the form of a screw, a nut held against rotation mounted on said screw, a pivotally mounted balancing lever, a compression spring arranged between said nut and said balancing lever to load the latter resiliently in dependence upon the rotary position of said screw, a nozzle which exhausts to atmosphere, means responsive to the position of the lever to throttle said nozzle, means for supplying fluid under pressure to the nozzle, and a balancing bellows which is connected to said lever at one end and fixed at its other end and fed with said fluid under pressure which thus provides a balancing pressure opposing the spring loading of said lever.

7. A tank depth gauge comprising a float suspended on a tape, a drum on to and off which the tape is wound as the float rises and falls with the depth of liquid in the tank, an input member in the form of a screw coupled to said drum, a nut held against rotation mounted on said screw, a pivotally mounted balancing lever, a compression spring arranged between said nut and said balancing lever to load the latter resiliently in dependence upon the rotary position of said screw, a nozzle which exhausts to atmosphere, means responsive to the position of the lever to throttle said nozzle, means for supplying fluid under pressure to the nozzle, and a balancing bellows which is connected to said lever at one end and fixed at its other end to apply a balancing force thereto opposing the spring loading of the lever, the bellows being supplied with said fluid under pressure which thus provides a balancing pressure opposing the spring load of said lever, said fluid under pressure also providing a pneumatic output signal representative of said liquid level.

References Cited by the Examiner

UNITED STATES PATENTS 2,248,322 7/41 Annin _____ 73—309
2,618,155 11/52 Conner et al. _____ 73—316

ISAAC LISANN, *Primary Examiner.*

LOUIS R. PRINCE, *Examiner.*